(12) United States Patent
Kachalia et al.

(10) Patent No.: US 11,537,335 B2
(45) Date of Patent: Dec. 27, 2022

(54) SYSTEM AND METHOD OF PROVIDING UNIVERSAL MOBILE INTERNET PROXY PRINTING

(71) Applicant: Cisco Technology, Inc., San Jose, CA (US)

(72) Inventors: Rahul Kachalia, Cary, NC (US); Kali Prasanna Mishra, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/575,479

(22) Filed: Jan. 13, 2022

(65) Prior Publication Data

US 2022/0137890 A1 May 5, 2022

Related U.S. Application Data

(63) Continuation of application No. 16/788,021, filed on Feb. 11, 2020, now Pat. No. 11,243,722.

(60) Provisional application No. 62/803,660, filed on Feb. 11, 2019.

(51) Int. Cl.
*G06F 3/12* (2006.01)
*H04L 69/08* (2022.01)

(52) U.S. Cl.
CPC .......... *G06F 3/1209* (2013.01); *G06F 3/1226* (2013.01); *G06F 3/1288* (2013.01); *G06F 3/1292* (2013.01); *H04L 69/08* (2013.01)

(58) Field of Classification Search
CPC .... G06F 3/1209; G06F 3/1226; G06F 3/1288; G06F 3/1292; H04L 69/08
USPC ........................................... 358/1.15
See application file for complete search history.

(56) References Cited

U.S. PATENT DOCUMENTS

| | | | |
|---|---|---|---|
| 10,326,804 B1 * | 6/2019 | Agarwal | H04W 36/0022 |
| 10,917,263 B1 * | 2/2021 | Sheehan | H04L 41/0806 |
| 2003/0078965 A1 | 4/2003 | Cocotis et al. | |
| 2004/0218207 A1 | 11/2004 | Biundo et al. | |
| 2006/0159110 A1 | 7/2006 | Choi et al. | |
| 2011/0082939 A1 | 4/2011 | Montemurro et al. | |
| 2015/0347683 A1 | 12/2015 | Ansari et al. | |
| 2017/0034015 A1 | 2/2017 | Li et al. | |
| 2018/0191666 A1 | 7/2018 | Rahman et al. | |

* cited by examiner

*Primary Examiner* — Allen H Nguyen
(74) *Attorney, Agent, or Firm* — Polsinelli

(57) ABSTRACT

Disclosed is a method to enable printing on legacy devices. The method includes discovering a legacy device that does not have a universal record that enables the legacy device to provide services to a mobile device through a network, appending the universal record for the legacy device, transmitting the universal record for the legacy device to a controller, receiving, at the controller and from the mobile device, a request for services which can be provided by the legacy device, transmitting, from the controller and based on the universal record for the legacy device, data associated with the legacy device to the mobile device to yield transmitted data and transmitting, based on an acceptance of the transmitted data by the mobile device, a service request from the mobile device to the legacy device for providing a service to the mobile device.

20 Claims, 7 Drawing Sheets

SYSTEM AND METHOD OF PROVIDING UNIVERSAL MOBILE INTERNET PROXY PRINTING

CROSS-REFERENCE TO RELATED APPLICATIONS

This application is a continuation of U.S. Non-Provisional patent application Ser. No. 16/788,021, filed Feb. 11, 2020, which claims the benefit of U.S. Provisional Patent Application No. 62/803,660, filed Feb. 11, 2019, the contents of which are incorporated herein by reference in their entireties.

TECHNICAL FIELD

The present technology relates to network technology and more specifically to wide area service gateways and new approaches to provide access to legacy service devices.

BACKGROUND

Some plug-n-play device technologies provide zero-touch service discovery and distribution for mobile devices. For example, Apple Bonjour technology provides zero-touch service discovery and distribution for plug-n-play mobile devices such as iPhone, iPad, etc. These services include residential or enterprise-class printers supporting the Apple AirPrint Bonjour Specification. The Apple printing standard defines print capabilities announcement and discovery based on Multicast DNS (Domain Network System) protocol as defined in RFC (Request for Comments) 6762 specification. The printing vendors are required to adhere to the specification for providing print services to driver-based end-points such as desktops and to driverless mobile end-points such as iPhone and iPads. The mobile end-points rely on AirPrint capable printers supporting universal drivers to dynamically discover and use the print services over the network. Hence, it is important that the printers providing such services are certified to support Universal Mobile Printing solution in the network.

However, across all verticals (enterprise, education, commercial, airports, etc.) it is very common to find legacy printers that may not support plug-n-play services such as Universal AirPrint services. Legacy service end-points continue to provide basic printing functions. As they provide such functions, the end-points become incompatible with constantly evolving mobile user end-points in the network. It becomes challenging to justify increased costs for network-wide printer upgrades simply to enable Universal Mobile Internet Printing solution for these evolving end-points. Until an upgrade, the printing solution remains unavailable to mobile users.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary concepts of the disclosure and are not therefore to be considered to be limiting of its scope, the principles herein are described and explained with additional specificity and detail through the use of the accompanying drawings in which.

DESCRIPTION OF EXAMPLE CONCEPTS

Figure 1:
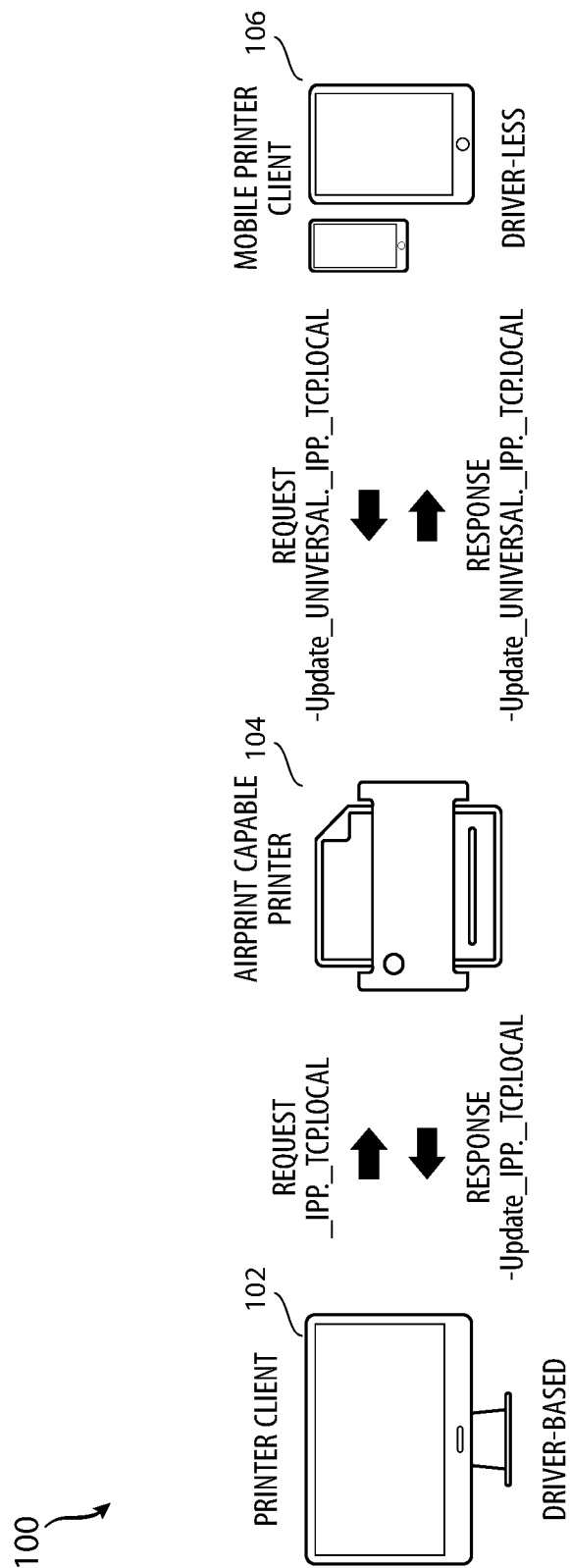
FIG. 1 illustrates an example communication network with a printer and a driver-based printer client and driverless mobile printer client.

Various examples described within the disclosure are discussed in detail below. While specific implementations are discussed, it should be understood that this is done for illustration purposes only. A person skilled in the relevant art will recognize that other components and configurations may be used without parting from the spirit and scope of the disclosure.

Various examples are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment", "an example" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable storage media that address the above technical issues and others. For example, a switching, wireless, and/or network controller system may be configured to bridge the gap between multi-vendor legacy printers and next-generation mobile end-points. In some examples, a digital network architecture (DNA) service for a solution in a DNA-center (DNA-C) and supporting agent devices are augmented to eliminate the above-mentioned mobile printing challenge. The service discovery gateway (SDG) agent can dynamically discover legacy AirPrint (or similar protocol) printers in the network and automatically append required service records to provide end-to-end transparent mobile printing solutions with seamless integration and without making forklift printing equipment upgrades and changes in overall network design, software or operations. This solution remains consistent and interoperable with Apple AirPrint Bonjour Specification standards allowing the co-existence of latest generation certified AirPrint Printers with legacy non-Airprint Printers, yet provide end-to-end serviceability and transparency. These legacy standards that are mentioned are only mentioned by way of example. Other legacy standards may also apply and be relevant to this disclosure. Thus, this disclosure is not limited to any specific printing standard. This is particularly true in that the disclosure covers any end-point service that might be accessed from a device.

Disclosed are methods and systems to enable printing or other services to be performed or access from legacy devices. An example method includes discovering a legacy device that does not have a universal record that enables the legacy device to provide services to a mobile device through a network, appending the universal record for the legacy device, adding the legacy service-related records in local service database, transmitting the universal record for the legacy device to a controller, receiving, at the controller and from the mobile device, a request for services which can be provided by the legacy device, transmitting, from the controller and based on the universal record for the legacy device, data associated with the legacy device to the mobile device to yield transmitted data and transmitting, based on an acceptance of the transmitted data by the mobile device, a service request from the mobile device to the legacy device for providing a service to the mobile device.

While Apple specifications and Apple devices are mentioned herein, the disclosure is not intended to be limited to any particular brand and can apply to any service-related specification, any type of mobile devices and any type of service component such as a printer or device that provides another type of service.

DETAILED DESCRIPTION

Apple Bonjour technology provides zero-touch service discovery and distribution for plug-n-play mobile devices such as iPhone, iPad etc. This service includes residential or enterprise-class printers supporting Apple AirPrint Bonjour Specification. The Apple printing standard defines print capabilities announcement and discovery based on Multicast DNS protocol on common local are network (LAN) and wireless local area network (WLAN) network segments. The printing vendors are required to adhere to the specification for providing print services to driver-based end-points such as desktops and to driverless mobile end-points such as iPhone and iPads. As noted above, the printing context can be expanded to any service component which may not be accessible to a remote device due to a particular specification to which older devices may not conform.

Thus, while the example is provided for a printer service, the specifications and services can vary beyond printing services. FIG. 1 illustrates a basic network 100 with a driver-based printer client 102, an AirPrint capable printer 104 and a mobile printer client 106. Driver-Based printer clients 102 transmit standard Internet Printing Protocol (_ipp), IPP over a secure socket layer (SSL) (_ipps) or Line Daemon Printing (_printer) signals to dynamically discover printers 104 in a local segment of a network. An AirPrint capable printer 104 responds with its source information and all other advanced capabilities to use with installed drivers. The mobile end-points 106 are driver-less, and rely on AirPrint capable printers 104 supporting the universal driver to dynamically discover and use the service over the network. They can have base serviceability with the sub-pointer (sub-PTR or sub-pointer) service of IPP and IPPS (Internet Printing Protocol over SSL). However, such end-points 106 may have limited access to use all AirPrint printing functions. Hence it is important the printers 104 providing such services are certified to support Universal Mobile Printing solution in the network.

Figure 2:
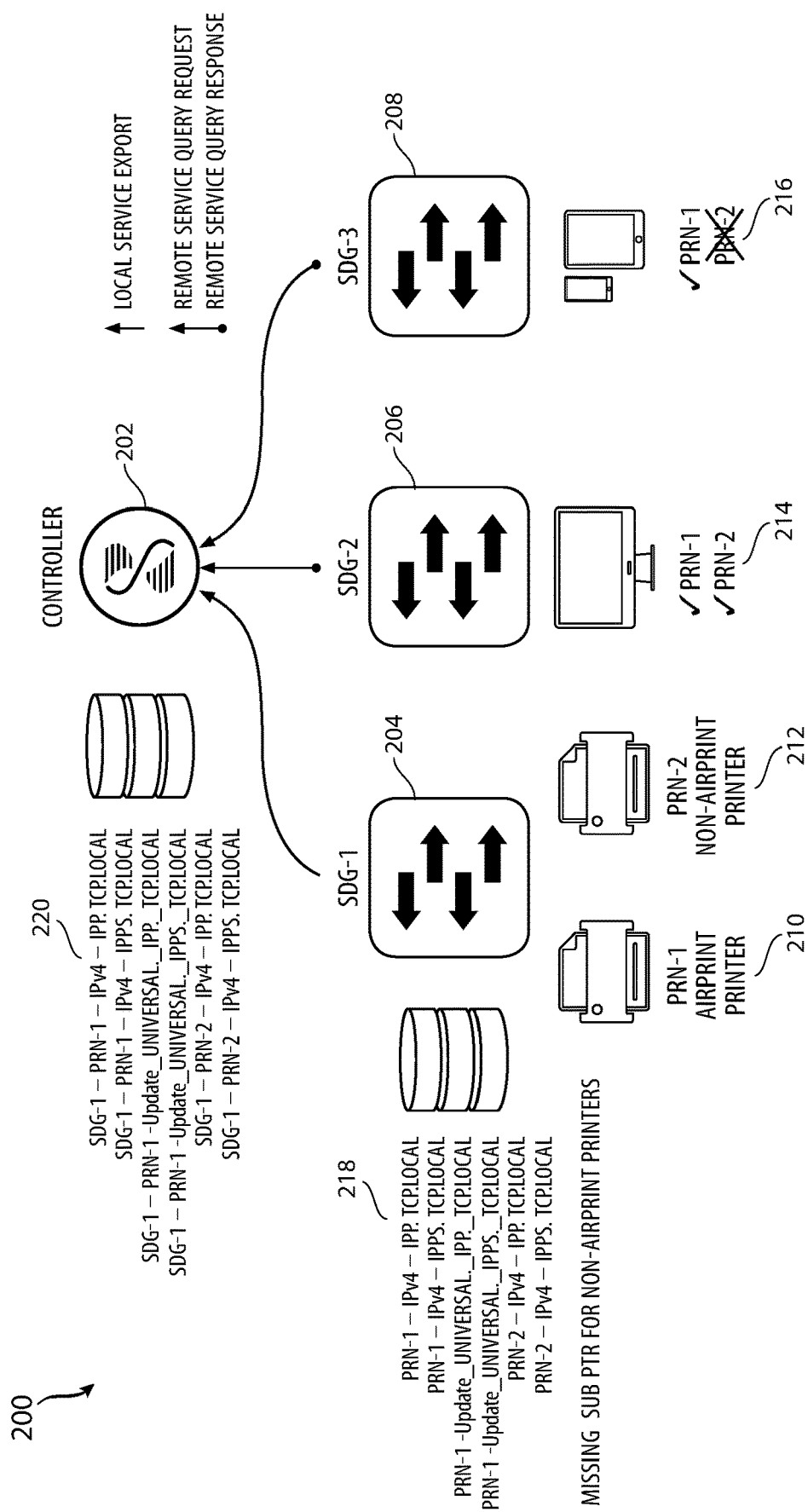
FIG. 2 illustrates a diagram of an example network architecture including a legacy device such as a legacy AirPrint-capable printer and printer clients.

However, across all verticals (enterprise, education, commercial, airports, etc.), it is very common to find legacy printers that may not support Universal AirPrint services, as they do not support AirPrint driver-less capabilities in printer firmware. FIG. 2 illustrates a network 200 having a controller 202, a service discovery gateway-1 (SDG-1) 204, an SDG-2 206 and an SDG-3 208. An AirPrint printer 210 is on the network as well as a non-AirPrint printer 212. A display 214 is shown on the network 200 as well as a mobile device 216. As such legacy service end-points (legacy printers 212) continue to provide basic printing functions with driver-based discovery and processing, they become incompatible with constantly evolving mobile user end-points in the network, and the mobile devices 216 may be unable to discover such printers (PRN-2 212) in the network 200 due to a lack of their capabilities. It becomes challenging to justify increased cost for network-wide printer upgrades simply to enable Universal Mobile Internet Printing solution for these evolving end-points 216.

The disclosure next provides some background on the Cisco Wide Area Bonjour solution. While Cisco is mentioned as an example solution, the solution of course can be applied by any provider and is not limited to any particular brand or implementation. The Cisco Wide Area Bonjour solution enables the Universal Mobile Printing solution in an end-to-end network environment. The Bonjour service discovery and distribution process is defined based on IT policy in two tier levels—Local and Wide Area Bonjour service domains. The distributed SDG (service discover gateway) agents, which in one aspect can be Cisco catalyst switches that contain policies and perform service discovery, service caching and service filtering functions, discover AirPrint capable printers and all associated records including IPv4 and IPv6 data from its local layer 2 segments and export the database to a central controller 202, such as, for example, the Cisco DNA-C Wide Area Bonjour Application. The print discovery messages from driver-based end-points from LAN or driver-less mobile end-points from WLAN are optimally remote service proxied from querying SDG agents. The controller 202 will perform policy lookup and distribute all service records transparently, providing end-to-end services management.

Note in FIG. 2 that the local service export of data from SDG-1 204 to the controller 202 highlights that what is missing from the non-AirPrint printers is the sub-PTR (pointer) data, which is the sub-pointer (sub-PTR) service of IPP and IPPS (Internet Printing Protocol over SSL). The sub-PTR typically is a record that is used to point a client device looking for a printing service to the proper device providing that service. However, there is no sub-PTR record for the non-AirPrint printers announced from legacy printers.

Figure 3:
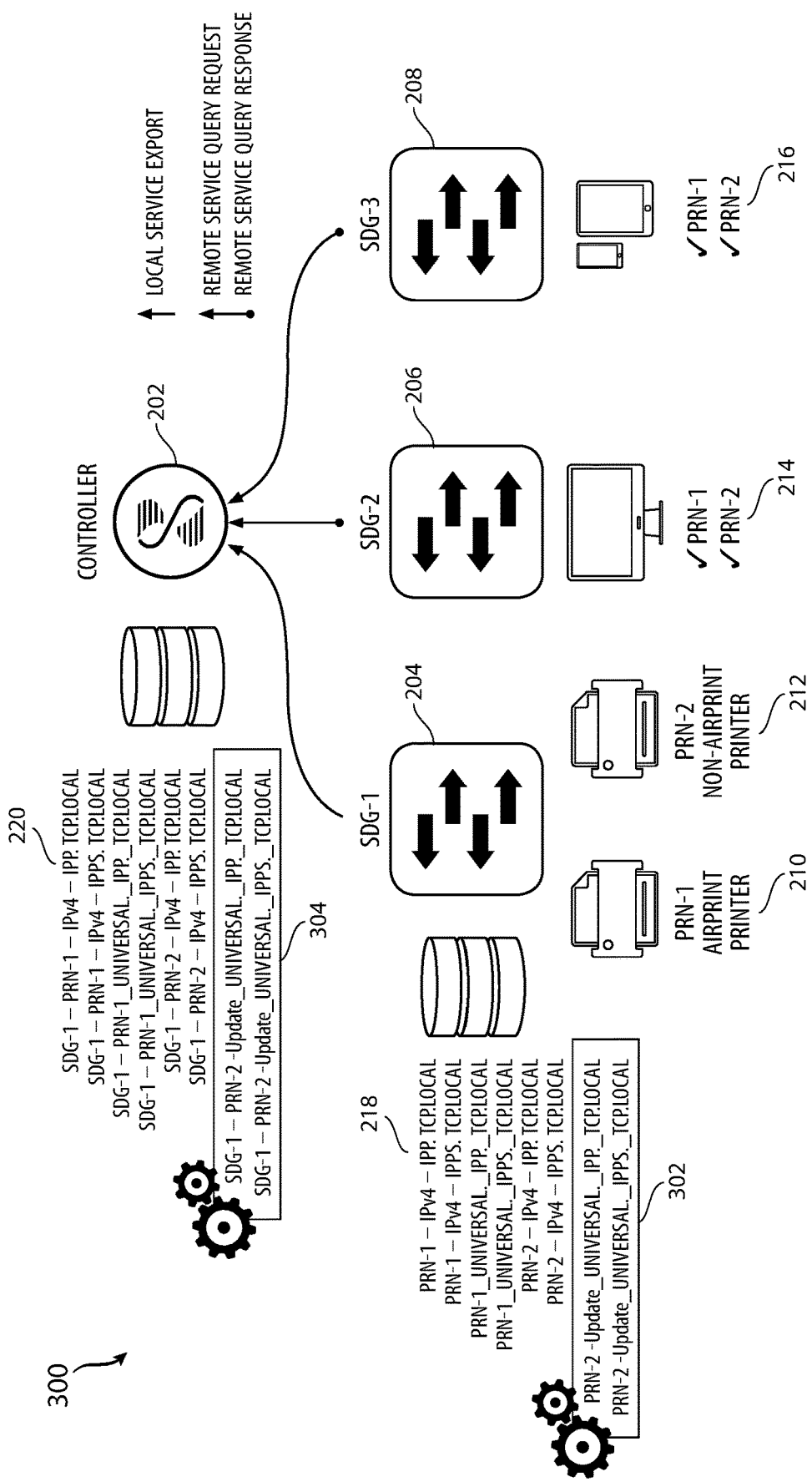
FIG. 3 illustrates a diagram of an example network architecture including a legacy device such as a legacy printer and the appending of universal printer data.

According to various examples and shown in FIG. 3, a digital network architecture (DNA)-center controller networking system 300 bridges the gap between multi-vendor legacy printers 212 and next-generation mobile end-points 216. The Cisco DNA service for Bonjour solution in DNA-center and supporting agent devices 204, 206, 208 are augmented in one example to eliminate the mobile printing challenge mentioned above. Of course this disclosure is not limited to a particular brand or digital network architecture and the concepts can apply to an networking system. The service discovery gateway (SDG) agent 204, 206, 208 can dynamically discover legacy Air-Print printers 212 in the network and automatically append required service records 302 to provide end-to-end transparent mobile printing solution with seamless integration and without making forklift changes in overall network design, software or operations. This solution remains consistent and interoperable with Apple AirPrint Bonjour Specification standards allowing the co-existence of latest generation certified AirPrint printers 210 with legacy non-AirPrint printers 212, yet provide end-to-end serviceability and transparency.

As shown in FIG. 3, the appended data for the non-AirPrint printer 212 is, for example, "PRN-2._universal._ipp._tcp.local and PRN-2._universal_ipps.tcp.local." 302 is automatically created for each announced pointer (PTR) such as IPP (Internet Printing Protocol) and IPPS. This record data is added in local service database 218 also exported to the controller 202 as shown in data 304.

Various examples of the subject technology are developed based on an understanding of AirPrint certified printers 210, the legacy non-AirPrint printers 212, and the mobile end-points 216. Further, the solution is also carefully aligned with the Apple AirPrint Bonjour Specification to assure it abides with the standards. If another specification or standard is used, the solution will be aligned with the respective standard. These examples improve upon and leverage the Multicast DNS (mDNS) protocol specifications described in RFC 6762 and identify the mobile printing requirements that are proxied or assisted by intermediate Ethernet, Wireless and Cisco DNA-center controller network systems providing Universal Mobile Printing solution across end-to-end Enterprise LAN|WLAN|WAN network infrastructure.

Various examples introduce advancements by adding a new set of intelligence in dynamically discovering and detecting AirPrint vs non-AirPrint capable end-points in Cisco IOS (Internetwork Operating System) catalyst switching software. The Cisco IOS software is referenced as only an example of a family of operating systems with network switches, routers, wireless controllers and access points. The extended capability uses the industry standard Multicast DNS protocol between the catalyst switch and the printers. The catalyst switch provides augmented software capabilities in a wide area Bonjour network domain that can represent the legacy AirPrint capable printer allowing remote mobile and driverless end-points such as the Apple iPhone, iPad or other device to dynamically discover and use all provided functions and services that a printer or other service providing device can offer. This proxy function can be implemented with exclusive settings on specific segments of the network that administrators can apply to enable this innovation.

Various examples provide for Cisco IOS software that can dynamically discover missing universal driver printing records, and cache and automatically append the sub-PTR for each print service types (i.e. _ipp and _ipps) for specific legacy printers to solve the key customer network challenge. The mobile devices now dynamically receive all required service records for end-to-end mobile service offerings.

In various examples, the IOS software is not limited to printing capabilities; rather, the catalyst switch provides the ability to short-fill additional multi-function services such as scanner of a legacy printer, or other services such as speech processing, video services, audio services, connectivity services, marketing services, sales services, and so forth.

Various examples relate to targeted Multicast DNS service records for universal drivers, all original advertised records such as PTR (Pointer), SRV (service), TXT (Text), A (IPv4) and AAAA (IPv6) records (used to find the IP address of a device based on name connected to the Internet) remain intact within Local Area Bonjour domain or across Wide Area Bonjour domain. Since universal driver records is a Multicast DNS PTR sub-record, the Cisco IOS software automatically aligns TTL (time-to-live) value advertised by PTR records in original advertisement by the legacy device. In addition, the system automatically appends universal driver sub-records to each printing protocol-type, including Internet Printing Protocol (IPP), IPP over SSL (IPPS) or Line Protocol Daemon (LPD).

Figure 4:
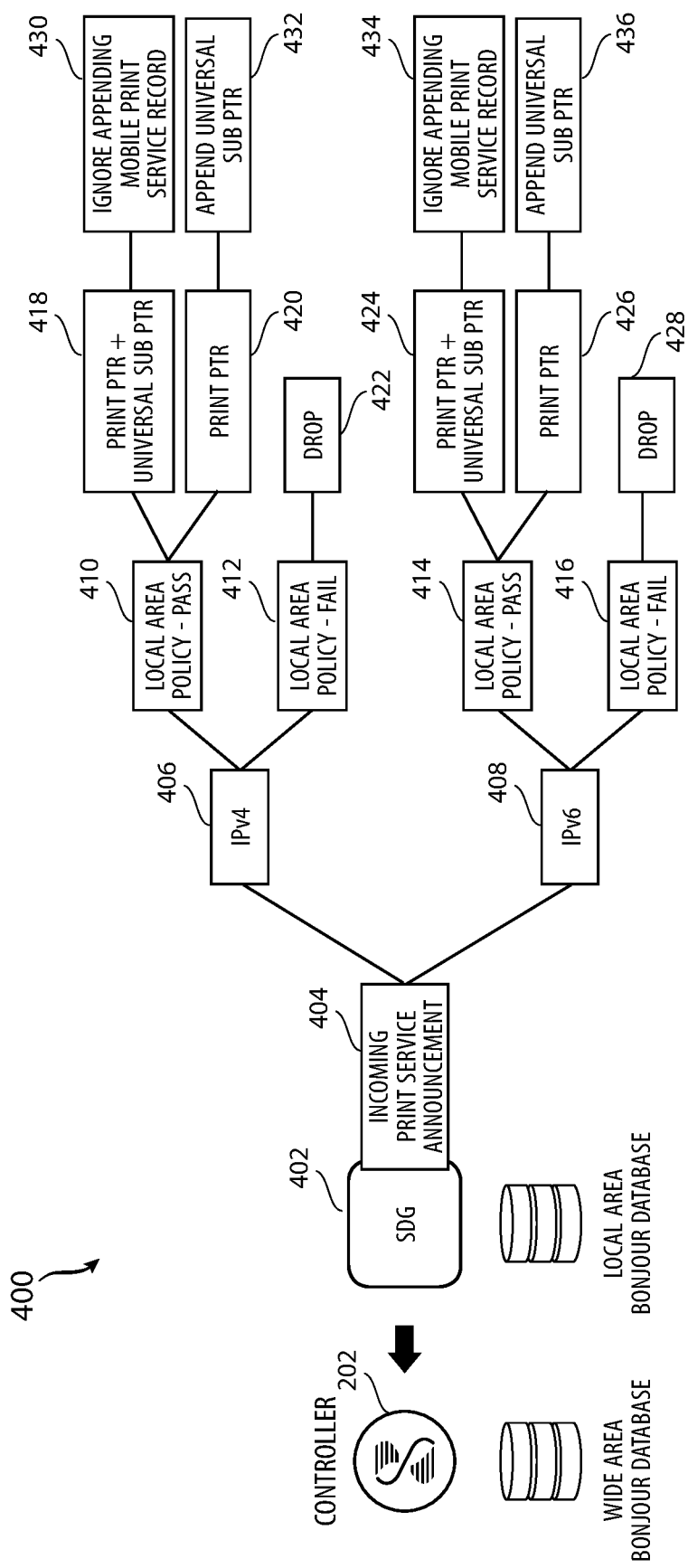
FIG. 4 illustrates a diagram of an example flow process of a network.

FIG. 4 illustrates an overall flow 400 for a per-printer and per-print-service workflow for the universal mobile print service algorithm. In FIG. 4, the SDG 402 can receive and transmit a communication related to a print service announcement. The algorithm can relate to seeking out and preparing non-AirPrint printers to be able to print from mobile devices. The SDG 402 it is associated with a local area database. The announcement 404 or flow can first proceed to an IPv4 segment of the local area network. If the service announcement complies with the local area policy 410, the request passes and the various printing devices are queried. If the printing device 418 is an AirPrint device that already has universal sub-PTR data, then the algorithm ignores appending a mobile print service record 430. If the printing device is more of a legacy device 420, then the algorithm requires appending the universal sub-PTR data 432. If a local area policy 412 does not allow the request or for some reason does not enable this algorithm to proceed, then the service announcement is dropped 422.

The print service announcement can also be delivered serially or in parallel to an IPv6 segment of the local area network 408. If the print service announcement passes a local policy 414, then the system identifies a printer that already has universal sub-PTR data 424 and ignores appending a mobile print services record number 434. For a printer 426 that is a legacy printer, the algorithm causes the system to append the universal sub-PTR data 436. If the local area policy fails 416, then the print service announcement is dropped 428. Again, this also applies to any device providing any service.

Various examples provide an augmented technology and it is integrated with existing Cisco DNA services for Bonjour solution supporting end-to-end policy-based Wide Area Bonjour services management. The Cisco DNA service for Bonjour is Cisco's system and the industry's only Wide Area Bonjour solution supporting policy management, security, location, scale and performance.

With the concepts disclosed above, customers (mobile devices) can enable a mobile Internet printing solution in the network that may consist of legacy printers. The Ethernet switched network devices can introduce advanced software capabilities to dynamically detect such legacy printers and automatically append key sub-records that can enable end-to-end multi-function services discovery and distribution for mobile end points to use transparently.

Various examples leverage catalyst switches and iOS software infrastructure to provide cost-effective and non-disruptive mobile service solution without making major forklift upgrades of legacy but functional devices. The concepts disclosed above can be claimed from the standpoint of any device disclosed in the network, such as from a legacy printer, a legacy service-providing device, a mobile device, a SDG, a controller or other components or combination of components within the overall network.

Figure 5:
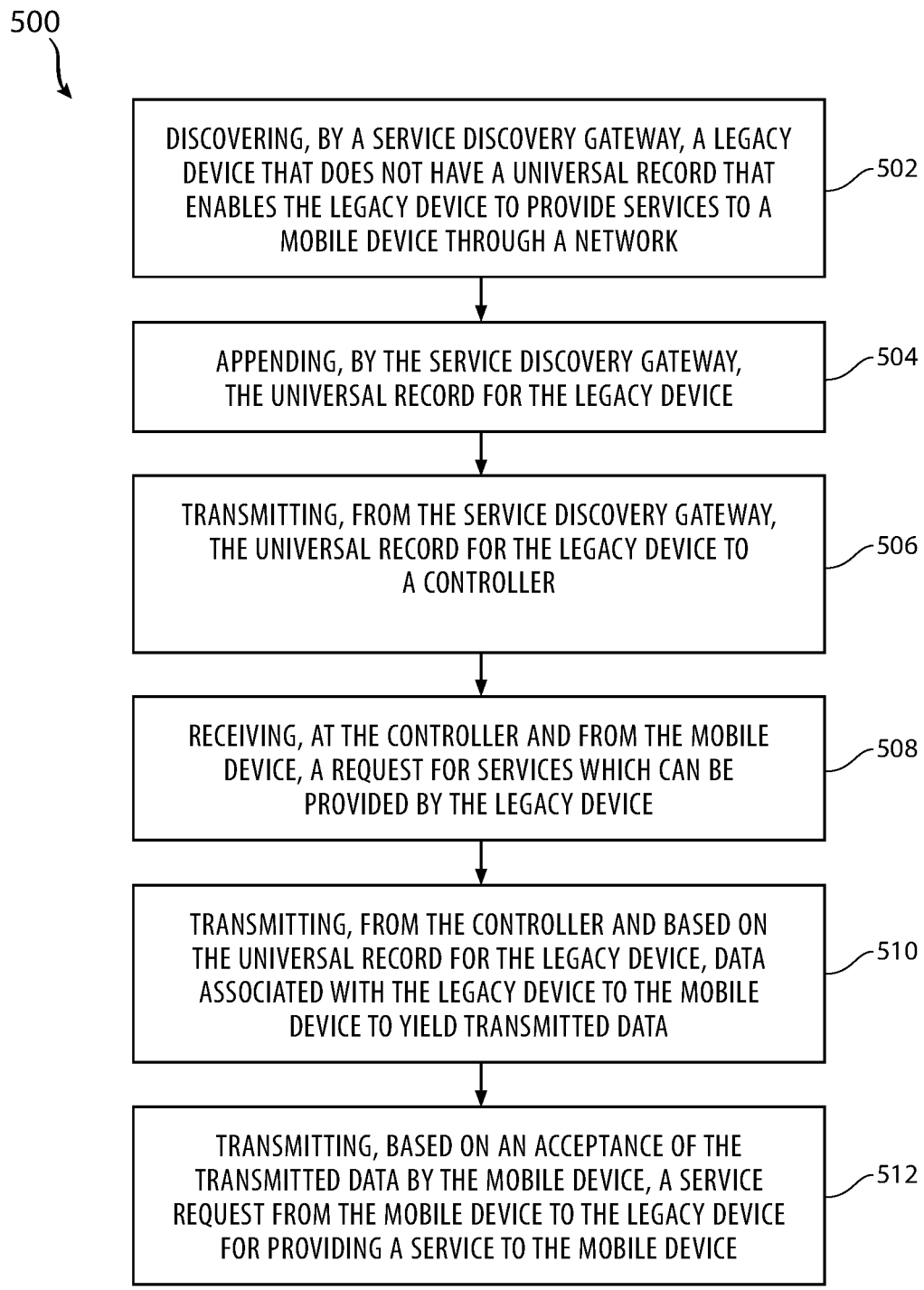
FIG. 5 illustrates a method example.

FIG. 5 illustrates a method example. A method can include one or more of discovering, by a service discovery gateway, a legacy device that does not have a universal record that enables the legacy device to provide services to a mobile device through a network (502), appending, by the service discovery gateway, the universal record for the legacy device (504), transmitting, from the service discovery gateway, the universal record for the legacy device to a controller (506), receiving, at the controller and from the mobile device, a request for services which can be provided by the legacy device (508), transmitting, from the controller and based on the universal record for the legacy device, data associated with the legacy device to the mobile device to yield transmitted data (510) and transmitting, based on an acceptance of the transmitted data by the mobile device, a service request from the mobile device to the legacy device for providing a service to the mobile device (512). As noted above, the method can also be covered from the standpoint of other devices participating in the process.

The legacy device can include a printer, a scanner, a database, or any other device that provides a service such as speech processing or artificial intelligence services. The universal record can include a sub-printer record for a print services type. This can also be applicable to other devices or other service types as well. The print services type can include one or more of the IPP Internet Printing protocol, the IPPS Internet Printing Protocol over the Secure Sockets Layer protocol or the LDP Line Daemon Printing protocol. Similar protocols can apply where other services are made available to mobile devices using these principles.

The discovering, by the service discovery gateway, of the legacy device that does not have a universal record that enables the legacy device to provide services to a mobile device through a network further can further include identifying a non-legacy device that includes a respective universal record and not appending the universal record to the non-legacy device. The appending, by the service discovery gateway, of the universal record for the legacy device, in one aspect, can be based on whether a local area policy allows the appending of the universal record to occur. The service discovery gateway can be associated with a local area network and the controller is associated with a wide area network.

Figure 6:
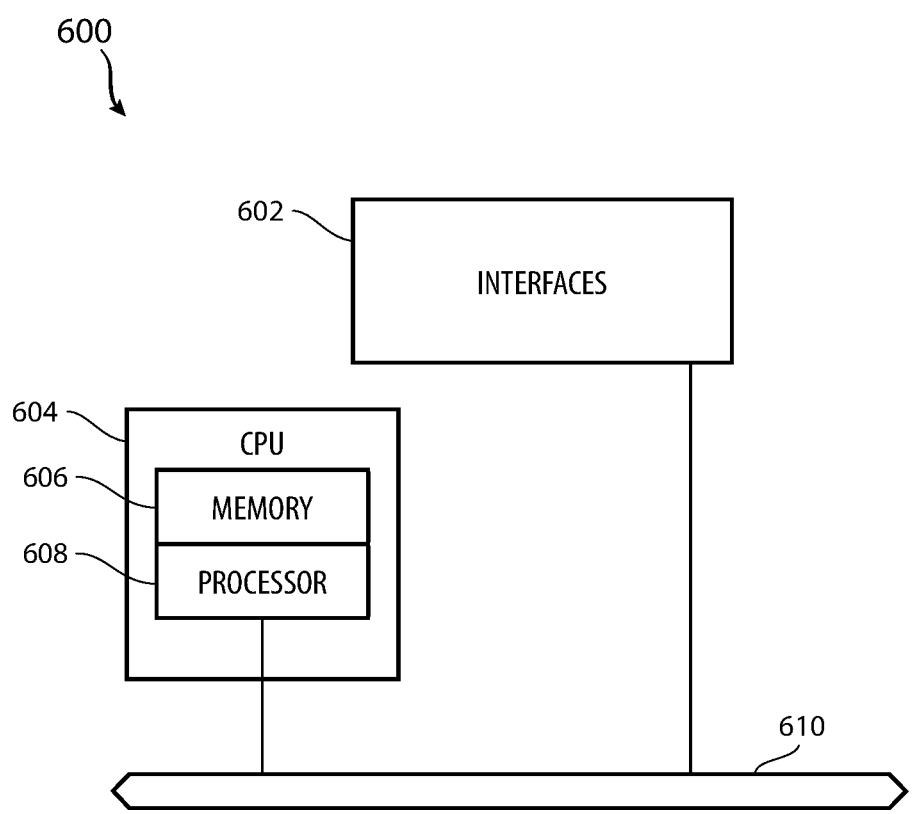
FIG. 6 illustrates an example network device in accordance with various examples.

FIG. 6 illustrates an example network device 600 suitable for implementing aspects of this disclosure. In some examples, the control plane 310 and/or the secure video processor (SVP) 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Automatic Teller Machine (ATM) interfaces, HSSI interfaces, Point of Sale (POS) interfaces, Fiber Distributed Data Interface (FDDI) interfaces, WiFi interfaces, 3G/4G/5G cellular interfaces, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
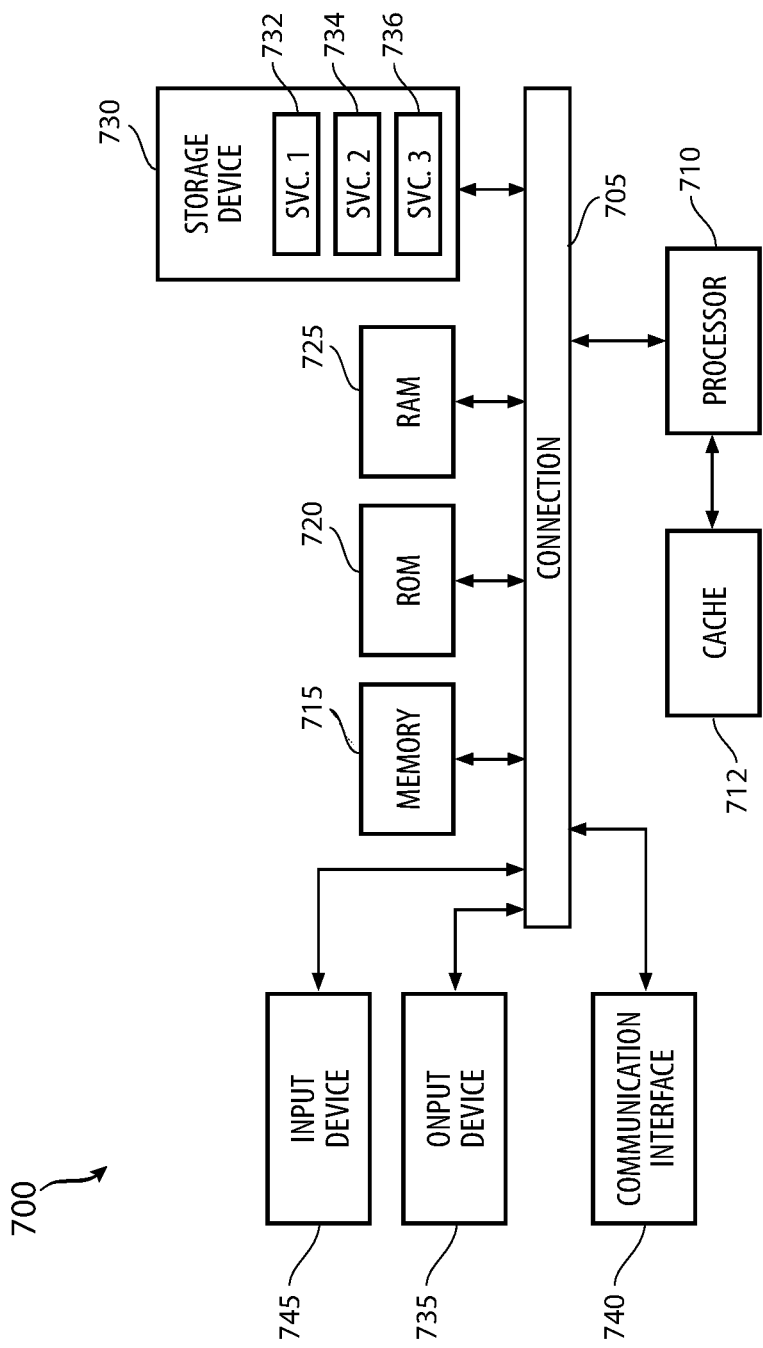
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software. Non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, universal serial bus (USB) devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
appending, by a service discovery gateway, a universal record for a legacy device associated with a network;
transmitting, from the service discovery gateway, the universal record for the legacy device to a controller to yield a stored universal record;
receiving, at the controller and from a mobile device, a request for services which can be provided by the legacy device; and
providing, based on the stored universal record, the services from the legacy device to the mobile device.

2. The method of claim 1, wherein the legacy device comprises a printer.

3. The method of claim 1, wherein the universal record comprises a sub-printer record for a print services type.

4. The method of claim 3, wherein the print services type comprises one or more of an Internet Printing protocol, an Internet Printing protocol over a Secure Sockets Layer protocol and a Line Daemon Printing protocol.

5. The method of claim 1, further comprising:
discovering, by the service discovery gateway, the legacy device, wherein the legacy device does not have the universal record that enables the legacy device to provide services to the mobile device through the network and wherein the discovering, by the service discovery gateway, of the legacy device further comprises identifying a non-legacy device that includes a respective universal record and not appending the universal record to the non-legacy device.

6. The method of claim 1, wherein appending, by the service discovery gateway, the universal record for the legacy device is based on whether a local area policy allows the appending of the universal record to occur.

7. The method of claim 1, wherein the service discovery gateway is associated with a local area network and the controller is associated with a wide area network.

8. A system comprising:
a service discovery gateway configured to:
append a universal record for a legacy device associated with a network;
transmit the universal record for the legacy device to a controller to yield a stored universal record, wherein the controller receives, from a mobile device, a request for services which can be provided by the legacy device; and
provide, based on the stored universal record, the services from the legacy device to the mobile device.

9. The system of claim 8, wherein the legacy device comprises a printer.

10. The system of claim 8, wherein the universal record comprises a sub-printer record for a print services type.

11. The system of claim 10, wherein the print services type comprises one or more of an Internet Printing protocol, an Internet Printing protocol over a Secure Sockets Layer protocol and a Line Daemon Printing protocol.

12. The system of claim 8, wherein the service discovery gateway is configured to discover the legacy device, wherein the legacy device does not have the universal record that enables the legacy device to provide services to the mobile device through the network further is configured to identify a non-legacy device that includes a respective universal record and not append the universal record to the non-legacy device.

13. The system of claim 8, wherein the service discovery gateway configured to append the universal record for the legacy device is based on whether a local area policy allows an appending of the universal record to occur.

14. The system of claim 8, wherein the service discovery gateway is associated with a local area network and the controller is associated with a wide area network.

15. A service discovery gateway comprising:
a processor; and
a computer-readable storage device storing instructions which, when executed by the processor, cause the processor to:
append a universal record for the legacy device associated with a network;
transmit the universal record for the legacy device to a controller to yield a stored universal record, wherein the controller receives, from a mobile device, a request for services which can be provided by the legacy device; and
provide, based on the stored universal record, the services from the legacy device to the mobile device.

16. The service discovery gateway of claim 15, wherein the legacy device comprises a printer.

17. The service discovery gateway of claim 15, wherein the universal record comprises a sub-printer record for a print services type.

18. The service discovery gateway of claim 17, wherein the print services type comprises one of an Internet Printing protocol, an Internet Printing protocol over a Secure Sockets Layer protocol or a Line Daemon Printing protocol.

19. The service discovery gateway of claim 15, wherein the computer-readable storage device stores additional instructions which, when executed by the processor, cause the processor to:
discover the legacy device, wherein the legacy device does not have the universal record that enables the legacy device to provide services to the mobile device through the network and wherein the discovering of the legacy device further comprises identifying a non-legacy device that includes a respective universal record and not appending the universal record to the non-legacy device.

20. The service discovery gateway of claim 15, wherein appending the universal record for the legacy device is based on whether a local area policy allows the appending of the universal record to occur.

* * * * *